J. D. GOLDSMITH.
EMERGENCY WHEEL FOR AUTOMOBILES.
APPLICATION FILED DEC. 26, 1918.

1,311,119. Patented July 22, 1919.

INVENTOR.
JOHN D. GOLDSMITH.
BY
*Lockwood & Lockwood*
ATTORNEYS

UNITED STATES PATENT OFFICE.

JOHN D. GOLDSMITH, OF INDIANAPOLIS, INDIANA.

EMERGENCY-WHEEL FOR AUTOMOBILES.

1,311,119.　　　　　　Specification of Letters Patent.　　Patented July 22, 1919.

Application filed December 26, 1918. Serial No. 268,265.

*To all whom it may concern:*

Be it known that I, JOHN D. GOLDSMITH, a citizen of the United States, and a resident of Indianapolis, county of Marion, and State of Indiana, have invented a certain new and useful Emergency-Wheel for Automobiles; and I do hereby declare that the following is a full, clear, and exact description thereof, reference being had to the accompanying drawings, in which like numerals refer to like parts.

This invention relates to emergency wheels for automobiles and other vehicles, and the prime feature of the invention is the provision of a wheel which may be attached to parts of the ordinary wheel of a vehicle in order to replace such wheels should a puncture occur, or should the usual form of wheel become broken, or otherwise impaired for use.

A further feature of the invention is the provision of means for readily and quickly attaching the emergency wheel to the parts of the ordinary wheel, so that should at any time the wheel of the automobile, truck or the like become broken, or the tire become punctured or otherwise incapacitated for use, the emergency wheel may be installed and used until a convenient point is reached for repairing the vehicle wheel, when the emergency wheel may be as conveniently removed as when being attached.

Other objects and advantages will be more fully set forth in the accompanying specifications.

Figure 1:
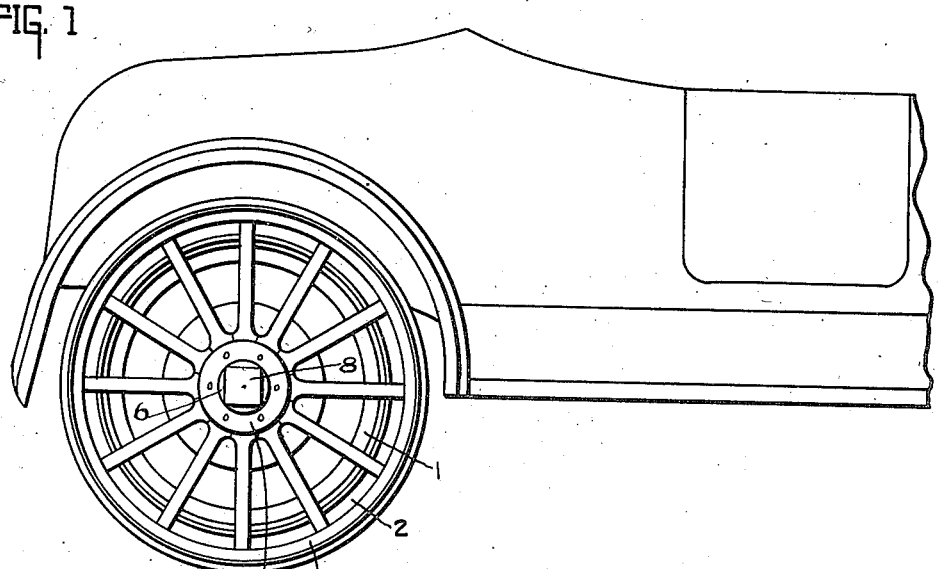
Figure 2:
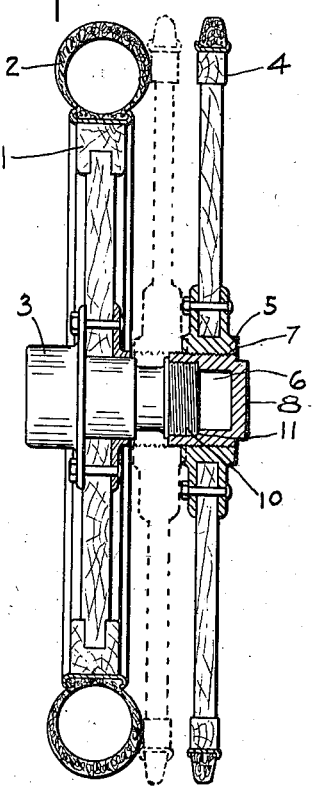
Figure 3:
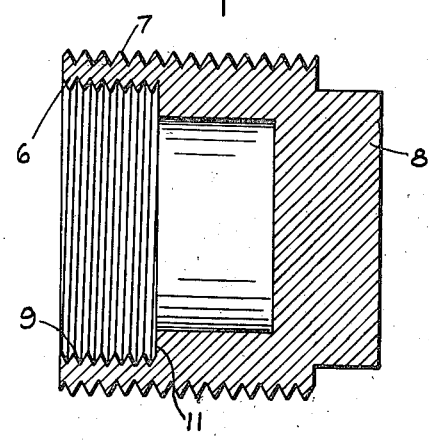

Referring to the drawings, which are made a part of this application Figure 1 is a side elevation of parts of an automobile showing the emergency wheel applied thereto. Fig. 2 is an enlarged transverse sectional view through the emergency wheel, showing the same attached to the hub of an automobile wheel. Fig. 3 is an enlarged sectional view of the auxiliary hub employed for attaching the emergency wheel to the regulation automobile wheel hub.

Referring to the drawings, in which similar reference numerals indicate similar parts throughout the several views, 1 indicates a vehicle wheel, which in this instance is shown as a wheel of an automobile having a pneumatic tire 2 thereon, the outer end of the hub 3 of said vehicle wheel being threaded as is usual to receive the ordinary hub cap (not shown).

As the wheels of vehicles, especially the pneumatic tires of automobiles and truck wheels, frequently become punctured or injured so that the air leaves the pneumatic tires, thus causing what is known as a flat wheel, and as it frequently occurs that the driver is not in a convenient place or does not have the proper facilities for repairing the damage, it is necessary to transport the vehicle to a garage or other convenient place before the repairs can be made, consequently frequently badly injuring or totally destroying the tire.

To overcome this objectionable feature I have produced my improved form of emergency wheel 4, which may be constructed in any suitable manner and of any preferred material, preferably having a solid rubber tire. The construction of this wheel is similar to other makes of wheels except that the hub 5 of the wheel is internally threaded to receive an auxiliary hub 6, said auxiliary hub being in the form of a hollow cap having threads 7 on its exterior for engagement with the threads on the interior of the hub 5. One end of the auxiliary hub is provided with a head 8, which may be engaged by a wrench for rotating the same, while the open end of the auxiliary hub is provided with threads 9 which are adapted to engage the threads 10 on the end of the hub 3 of the vehicle wheel, the open end of the hollow portion of the auxiliary hub 6 being of greater diameter than the remaining portion thereof to provide a shoulder 11, against which the end of the hub 3 abuts, and by tightly turning the auxiliary hub against the end of the vehicle wheel hub, said auxiliary hub will be normally held against independent rotation of the vehicle wheel.

In Fig. 2 of the drawing, the emergency wheel is shown in full lines but partially turned to position on the auxiliary hub, and is shown by dotted lines as turned to full position on the auxiliary hub, and when turned its full distance onto the auxiliary hub, the inner face of the emergency wheel binds against the outer face of the vehicle tire and wheel and thus causes both wheels to rotate in unison.

The emergency wheel, when not in use, is carried on any suitable part of the vehicle, and should the tire of the vehicle wheel become deflated, or the wheel become broken, it is but necessary to elevate the injured wheel and remove the hub cap therefrom, after which the auxiliary hub 6 is turned on to the threaded end of the vehicle wheel hub until the shoulder 11 is tightly wedged against the end of the vehicle hub. The emergency wheel 5 is then turned on to the threaded outer surface of the auxiliary hub, and when turned to the proper point the vehicle wheel, having the emergency wheel attached thereto, is lowered until the weight rests upon the emergency wheel. The vehicle may then be moved to any convenient place for receiving repairs, the emergency wheel serving the same purpose as the vehicle wheel were the vehicle wheel in perfect condition.

The emergency wheel may be so constructed as to be very light and at the same time maintain sufficient strength and durability sufficient to enable the same to perform the functions required of it, and consequently such wheel will not materially add to the weight of the vehicle, and as no part of the hub of the emergency wheel projects any distance beyond the face of the wheel it can rest flat against parts of the vehicle and thus occupy a minimum amount of space. Furthermore the emergency wheel can be used in connection with the ordinary vehicle, automobiles, trucks and in fact any motor propelled vehicles, and will require but little time for attaching the same to the parts of the vehicle wheel.

It will likewise be seen that when the time is limited for reaching a certain destination, and should a puncture occur, the driver need not consume time in stopping to repair the puncture, as it is only necessary to apply the emergency wheel and continue on his journey, the emergency wheel serving the purpose until the journey's end is reached, and the application of the emergency wheel requires far less time than would be required to repair the puncture in the tire of the vehicle wheel.

While an auxiliary hub is herein shown, the invention is not limited to the use of such hub, as it consists chiefly in securing the emergency wheel beside and against the regular vehicle wheel, in any suitable way, and, therefore, it is not desired to limit this invention to the particular way or means herein disclosed.

The invention claimed is:

1. The combination with a vehicle wheel, including a hub, having threads exteriorly thereof, of an emergency wheel, and an auxiliary hub separate from the vehicle wheel and between the hub of the vehicle wheel and the emergency wheel for carrying the emergency wheel adapted to be engaged with the threaded portion of the wheel hub, said emergency wheel being adjustably mounted on said auxiliary hub for movement toward or from the vehicle wheel.

2. The combination with the wheel of a vehicle, of an emergency wheel, including an interiorly threaded hub, an exteriorly threaded auxiliary hub separate from and between the vehicle wheel hub and the hub of the emergency wheel for engagement with the threaded portion of the hub of the emergency wheel, whereby the emergency wheel may be adjusted thereon and means for attaching the auxiliary hub to the vehicle wheel.

3. The combination with a vehicle wheel having a pneumatic tire, and a hub for said wheel having threads at its free end, of an emergency wheel, a hub for said emergency wheel having internal threads, and an auxiliary hub between the vehicle wheel hub and the emergency wheel hub having internal and external threads for engagement with the threads of the vehicle wheel hub and the emergency wheel hub respectively.

4. The combination with a vehicle wheel having a pneumatic tire, of an emergency wheel having internal threads therethrough, an auxiliary hub threaded onto the vehicle hub, said auxiliary hub being threaded throughout its length for engagement with the internal threads of the emergency wheel whereby said emergency wheel may be adjustably mounted thereon and turned into engagement with the tire of the vehicle wheel for holding the emergency wheel against casual reverse rotation on the auxiliary hub.

In witness whereof, I have hereunto affixed my signature.

JOHN D. GOLDSMITH.